United States Patent [19]

Randall

[11] Patent Number: 5,726,516
[45] Date of Patent: Mar. 10, 1998

[54] ROTOR FOR HIGH SPEED SWITCHED RELUCTANCE MACHINE

[75] Inventor: Steven P. Randall, Headingley, United Kingdom

[73] Assignee: Switched Reluctance Drives, Ltd., Harrogate, United Kingdom

[21] Appl. No.: 477,902

[22] Filed: Jun. 7, 1995

[30] Foreign Application Priority Data

Apr. 7, 1995 [GB] United Kingdom ............... 9507272

[51] Int. Cl.$^6$ .................. H02K 1/22; H02K 1/06; H02K 3/48
[52] U.S. Cl. ................. 310/261; 310/217; 310/271
[58] Field of Search .................. 310/261, 42, 43, 310/156, 168, 162, 166, 217, 270; 29/596, 598

[56] References Cited

U.S. PATENT DOCUMENTS

| | | | |
|---|---|---|---|
| 3,657,582 | 4/1972 | Phelon | 310/156 |
| 3,659,129 | 4/1972 | Petterson | 310/216 |
| 3,943,391 | 3/1976 | Fehr | 310/103 |
| 4,469,970 | 9/1984 | Neumann | 310/156 |
| 4,916,346 | 4/1990 | Kliman | 310/216 |
| 5,023,502 | 6/1991 | Johnson | 310/261 |
| 5,045,742 | 9/1991 | Armstrong et al. | 310/254 |
| 5,300,845 | 4/1994 | Fanning et al. | 310/217 |
| 5,554,900 | 9/1996 | Pop, Sr. | 310/156 |

*Primary Examiner*—Clayton E. LaBalle
*Assistant Examiner*—Michael J. Wallace, Jr.
*Attorney, Agent, or Firm*—Arnold, White & Durkee

[57] ABSTRACT

A rotor assembly for a reluctance machine is disclosed in which the rotor assembly comprises a stack of rotor laminations having a plurality of rotor poles defining interpole regions. The rotor assembly also comprises a cage including an end plate and support bars, which may be electrically conductive, that are axially aligned within the interpolar regions that lie between adjacent rotor poles. When the support bars are electrically conductive, the support bars can become transient "flux blockers" as the rotor assembly rotates past a stator pole, blocking the flow of flux through the interpole regions and improving the performance of the motor.

34 Claims, 9 Drawing Sheets

FIG. 9 ns must be annealed for strength, often resulting in a rotor with inferior magnetic properties. Such sub-optimum magnetic characteristics can result in motor inefficiencies.

Another approach used in the prior art is to leave the diameter of the central bore 14 constant but thicken the rotor back-iron 18 by reducing the interpolar gap. While this approach produces a rotor arrangement stronger than the typical arrangements, it results in an increase in the minimum inductance of the machine which leads to a degradation of performance. The decrease in performance can be alleviated by lengthening the rotor, but this results in the occurrence of the problems discussed above.

Figure 1A:
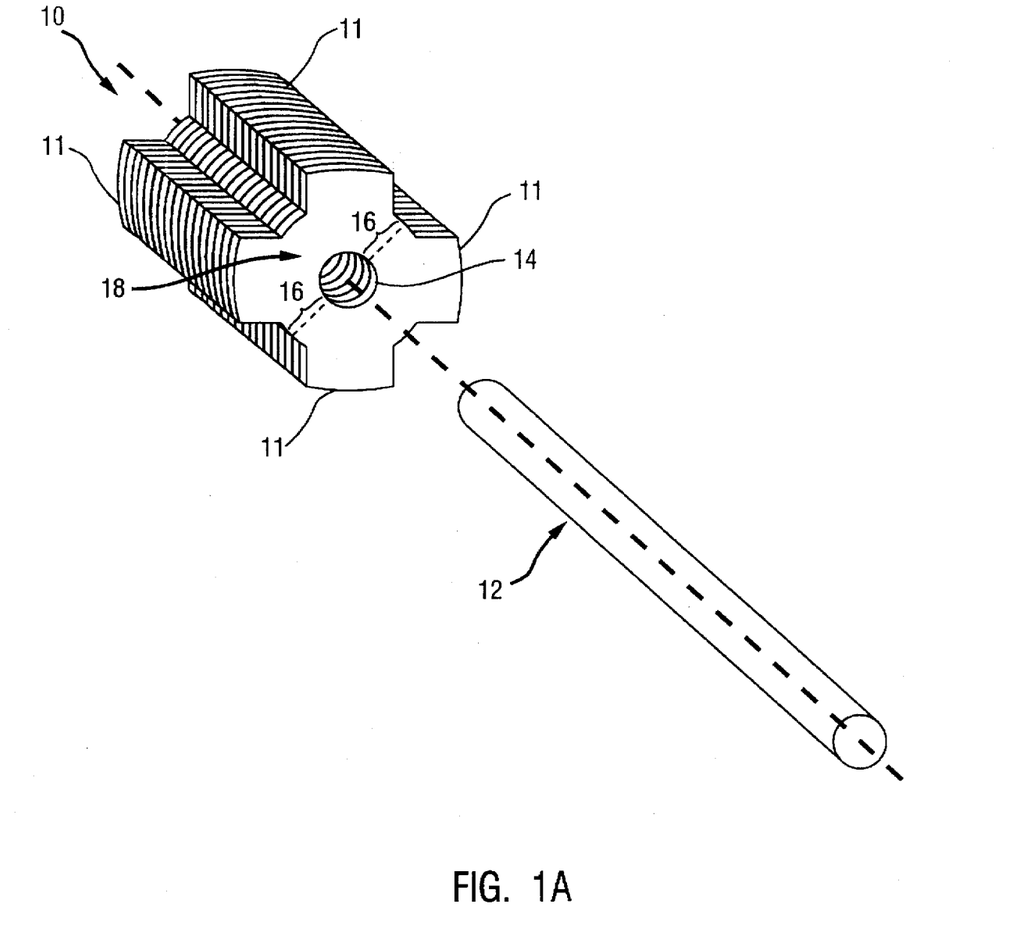
FIGS. 1A–1C illustrate a known rotor assembly for a reluctance motor.
Figure 1B:
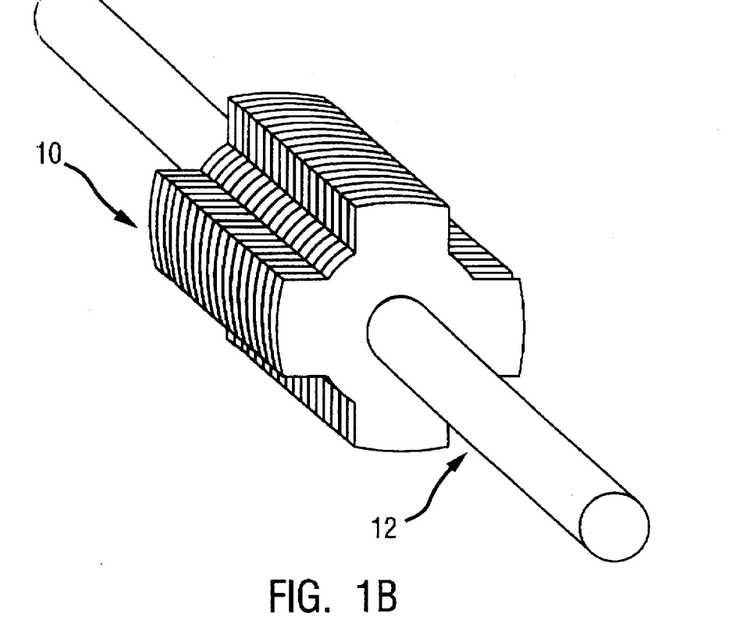
Figure 1C:
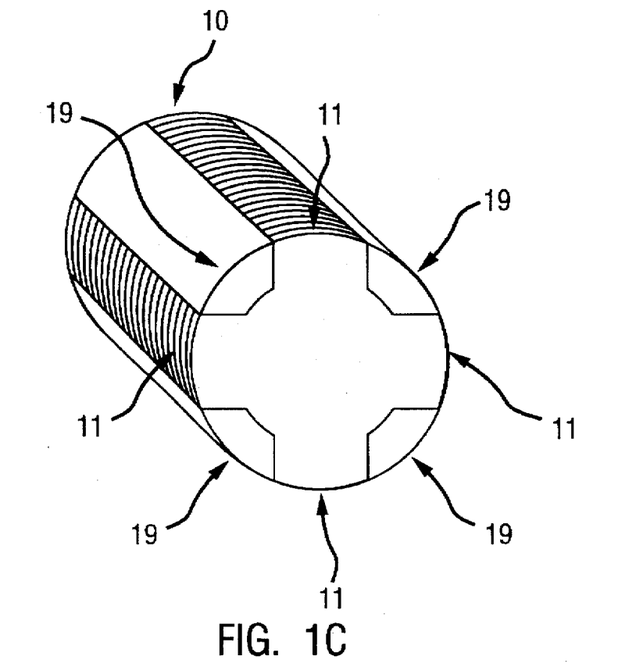

Still another approach used in the prior art is described in U.S. Pat. No. 5,053,666 (Kliman et al.) which describes a rotor with nonmagnetic, nonconductive support members 19 inserted into the rotor interpolar gaps between the rotor poles 11 as illustrated in FIG. 1C. The support members 19 support the rotor laminations, help to bear the centrifugal forces exerted on the laminations, reduce windage losses, and allow for a higher maximum speed. Another feature of this arrangement is that the shaft can be eliminated and the rotor back-iron can be increased accordingly, without reducing the interpolar gaps but while reducing iron losses. One problem with this arrangement is that flux from the stator poles still flows through the interpolar regions, instead of substantially all of the flux flowing through the rotor poles. This flow of flux through the interpole regions decreases the machine performance.

ROTOR FOR HIGH SPEED SWITCHED RELUCTANCE MACHINE

FIELD OF THE INVENTION

The present invention relates generally to an improved rotor for use with reluctance machines. In particular, the present invention relates to a stiff rotor assembly for reluctance machines in which a support cage of conductive material is provided to improve the performance of the reluctance machine.

BACKGROUND OF THE INVENTION

In typical reluctance machines, a stack of rotor laminations having a central bore passing therethrough is affixed to a metallic shaft. As the rotor rotates, torque is developed along the shaft which can be used to perform useful work. One example of a typical prior art rotor shaft assembly is illustrated in FIGS. 1A and 1B. As illustrated in FIG. 1A a stack of rotor laminations 10 having outwardly extending portions 11, referred to as rotor poles, has a bore 14 passing therethrough. The other portion of the rotor shaft assembly is a metallic shaft 12 which is typically made of a hard metallic material such as steel. The shaft is placed within the central bore 14 of the stack of rotor laminations 10 to produce a rotor/shaft combination as illustrated in FIG. 1B. One problem with using the typical rotor/shaft combination in reluctance machines is that, at high speeds, significant stresses are placed on the laminations that comprise the rotor stack. These stresses are largely a result of the centrifugal stresses placed on the rotor produced by the high speed rotation. These stresses may cause the rotor laminations to crack along the axis illustrated by the dashed line 16 in FIG. 1A. Another common problem associated with the use of reluctance motors in high speed applications is rotor iron loss.

In the past, several approaches have been taken to develop rotors capable of handling high speed applications which mitigate the problems discussed above. The most common approach is to decrease the rotor diameter. This, however, results in decreased performance unless the rotor length is increased correspondingly to maintain the same active volume for a given output. If the rotor is lengthened, however, the shaft becomes longer and thinner which results in reduced stiffness of the rotor and a consequent decreased maximum safe speed. This is contrary to the desirability of having a high speed design which allows a high maximum speed. Another common approach is to attempt to thicken the rotor back-iron 18. When this portion is thickened, however, it may be necessary to reduce the diameter of the central bore 14 resulting in a thinner and more flexible shaft. Although the rotor lamination is better able to handle the high speed stresses, the use of a thinner shaft often results in unwanted vibration and flexibility of the rotor-shaft combination and, concomitantly, a rotor with a rather low maximum safe speed.

A further problem with known approaches to producing high speed rotors is that the laminations that comprise the rotor must be annealed to produce laminations having sufficient mechanical strength. As those skilled in the art will recognize, annealing of the rotor laminations may be accomplished for both mechanical strength and magnetic properties. Unfortunately, the annealing methods that produce laminations with high magnetic strength often compromise the magnetic properties of the laminations. Accordingly, because the mechanical strength of the rotor laminations is a significant factor in these known rotors, the rotor lamina-

SUMMARY OF THE INVENTION

A rotor assembly in a reluctance machine is provided comprising a stack of rotor laminations having a plurality of rotor poles. The rotor assembly also comprises a cage including an end plate and support bars that are axially aligned within the interpolar gaps which lie between adjacent rotor poles. The support bars comprise electrically conductive, nonferromagnetic material and are not necessarily insulated from the rotor poles. A second end plate may be coupled to the support bars and can comprise an insulating material or barrier such that no conductive loop forms around the rotor poles.

Moreover, in one embodiment of the present invention a rotor assembly is provided comprising highly conductive support bars. The support bars can be insulated or electrically coupled to the stack of rotor laminations. During operation of the machine, the highly conductive support bars become transient "flux blockers" that block flux flowing through the inter-pole regions of the rotor and increase the motor's efficiency.

In yet another embodiment of the present invention, a rotor assembly is provided which is supported by at least one band of fiber applied around the support bars and stack of rotor laminations to provide support thereto. The bands may be disposed within notches in the support bars.

Further provided is a rotor assembly comprising first and second cage members, each having support bar portions axially aligned between said rotor poles. The support bar portions of the cage members are coupled together. The cage members can both comprise insulating material or conductive material or one can comprise an insulating material and the other a conductive material. If the cage members both comprise conductive material, an insulating member is disposed therebetween such that no conductive loop forms around the rotor poles. The support bar portions can be coated with a highly conductive material and/or supported with fiber banding.

Further provided is a rotor assembly with a plate disposed within the stack of rotor laminations and between first and second cage members to provide support thereto. If the cage members both comprise a conductive material, the plate may comprise an insulating material so that no conductive loops form around the rotor poles. The support bar portions can be coated with a highly conductive material and/or supported with fiber banding.

Also provided is a rotor assembly having a stack of rotor laminations with two ends and a plurality of outwardly extending rotor poles. Two end portions are located at either end of the stack. At least one plate, having exposed portions extending radially between the rotor poles is disposed within the stack. Also included are support bar portions axially aligned between the rotor poles and axially aligned and coupled to the exposed portions and the end portions. The support bar portions can be coated with a highly conductive material.

BRIEF DESCRIPTION OF DRAWINGS

Other objects, features, and advantages of the present invention will be apparent from the detailed description of exemplary embodiments and the accompanying drawings in which.

DETAILED DESCRIPTION OF THE INVENTION

The present invention provides for an improved rotor assembly for use in reluctance machines. In the present invention, the rotor shaft of typical reluctance machines is removed and rotor stiffness is maintained or increased by support bars passing through the rotor interpolar gaps. These bars form a "cage" or "external shaft" which holds the rotor laminations in place. In one embodiment of the present invention, the bars that form the cage are electrically conductive such that eddy currents flow in the bars during motor operation. These eddy currents transiently exclude flux from flowing through the inter-pole regions of the rotor, transiently reducing the minimum inductance of the motor and improving motor performance.

While the present invention is applicable to all forms of reluctance machines, including motors and generators, the discussion here focuses on a reluctance motor as an exemplary embodiment of the present invention. It should be understood that the present invention is equally applicable to generators.

Figure 2:
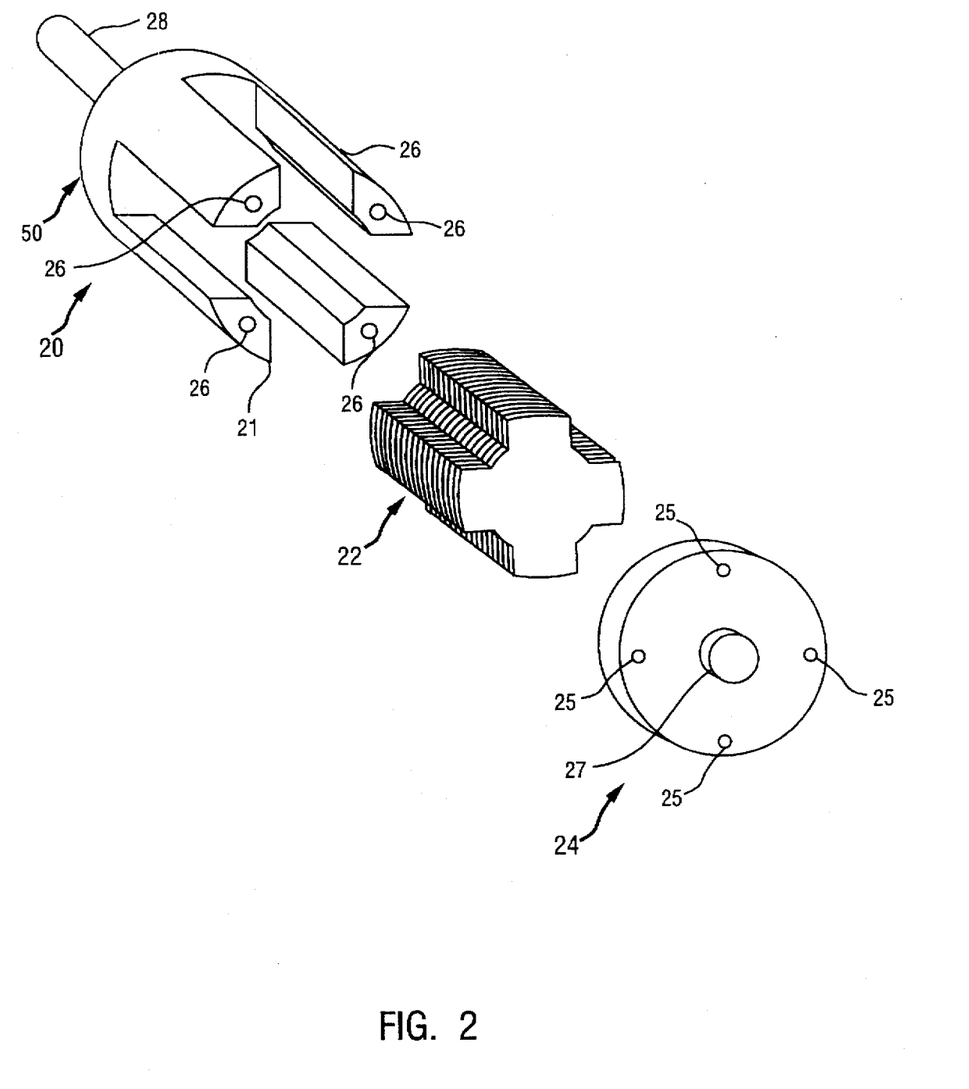
FIG. 2 provides an exploded, perspective view of a rotor assembly with support bars according to the present invention.

FIG. 2 illustrates one embodiment of a rotor assembly in accordance with the present invention in which a stack of specially constructed rotor laminations 22 is placed in a support cage 20 formed from support bars 21. An end plate 24 holds the lamination stack 22 in place.

Unlike the rotor laminations used in most traditional rotor arrangements, the rotor laminations of the present invention do not necessarily have a central bore passing therethrough to receive a shaft. The reduction or elimination of this central bore in the present invention allows for the construction of rotor laminations with a relatively thick rotor backiron. This relatively large rotor backiron reduces both the flux density in the rotor and the iron losses in the rotor backiron. Still further, because the rotor backiron is larger in comparison to traditional rotor assemblies, the rotor backiron centrifugal stresses are less than those found in most traditional rotor arrangements and the rotor diameter need not be quite as small as for a similar sized traditional rotor arrangement.

A further advantage of the rotor laminations of the present invention is that the elimination of the shaft bore greatly increases the strength of the rotor lamination stack.

Because of the special construction of the rotor laminations of the present invention it is possible to make the rotor slot deeper than would be possible with a traditional rotor assembly. This increase in the depth of the rotor slot reduces the minimum inductance of the machine and improves the electromagnetic performance of the machine.

In the embodiment of FIG. 2 the stack of rotor laminations 22 is placed within a cage 20 formed from support bars 21, such that support bars 21 essentially fill the interpole regions of the rotor. In the embodiment of FIG. 2, the support bars are attached to an end plate 24 that is located at one end of the rotor assembly.

In constructing a rotor assembly in accordance with the present invention, the materials comprising the support bars 21 should be chosen carefully. Generally, the support bars 21 should not comprise ferromagnetic material because such material could interfere with the electromagnetic performance of the motor. Accordingly, steel would not be a leading candidate for the construction of support bars 21. Suitable materials for the support bars 21 include nonmagnetic stainless steel, titanium, high-strength aluminum alloys, brass, ceramic, carbon, high strength plastic and similar materials. In one embodiment of the present invention the support bars 21 comprise an electrically conductive material. In such an embodiment, the normal operation of the machine will induce eddy currents in the conductive material that comprises the support bars 21. These eddy currents will have the effect of transiently reducing the minimum inductance of the machine as the support bars 21 rotate past the stator poles of the stator. This would exclude flux flow from the stator pole through the interpolar gaps of the rotor and enhance the desired flux flow from the stator poles through the rotor poles. The net effect of this flux exclusion resulting from using a conductive cage 20 is increased motor performance and better motor efficiency.

Figure 3A:
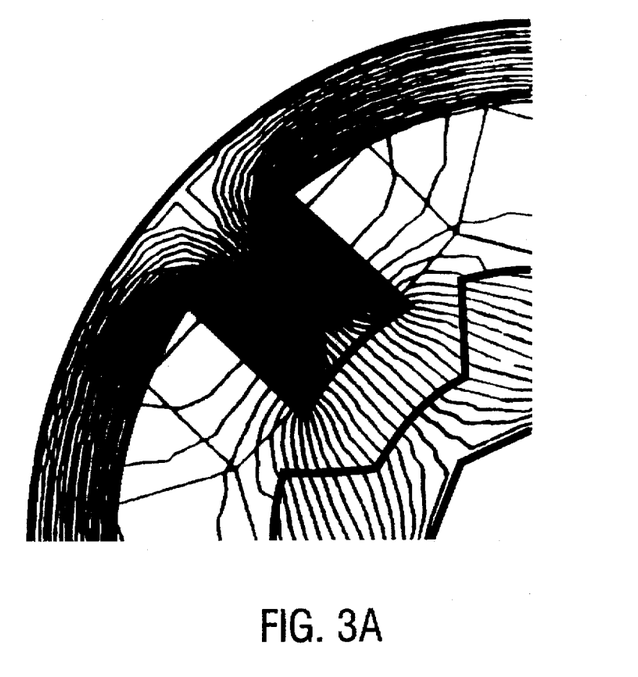
FIGS. 3A and 3B generally illustrate, respectively, flux flow patterns for a typical rotor assembly and for the rotor assembly of the present invention.

As those skilled in the art will appreciate, the performance of a switched reluctance machine is in part tied to the magnitude of the flux flow through the rotor poles. In general, the greater the flux flow through the rotor poles, the greater the maximum possible torque. In typical switched reluctance machines, as a rotor pole approaches a stator pole, there is a tendency for flux to flow both from the stator pole through the rotor pole and from the stator pole through the interpole regions. This is generally illustrated in FIG. 3A. In FIG. 3A, the density of the flux lines in a particular area corresponds to the magnitude of the flux flow through the area. There is also a flux flow from the stator pole through the interpole region of the rotor. The flux flow through the rotor pole is generally desirable and contributes to the development of torque of the motor. The flux flow through the interpole regions of the rotor, however, is generally undesirable and reduces the efficiency of the motor. The rotor assembly of the present invention reduces the amount of undesirable flux flow through the interpole regions of the rotor.

Figure 3B:
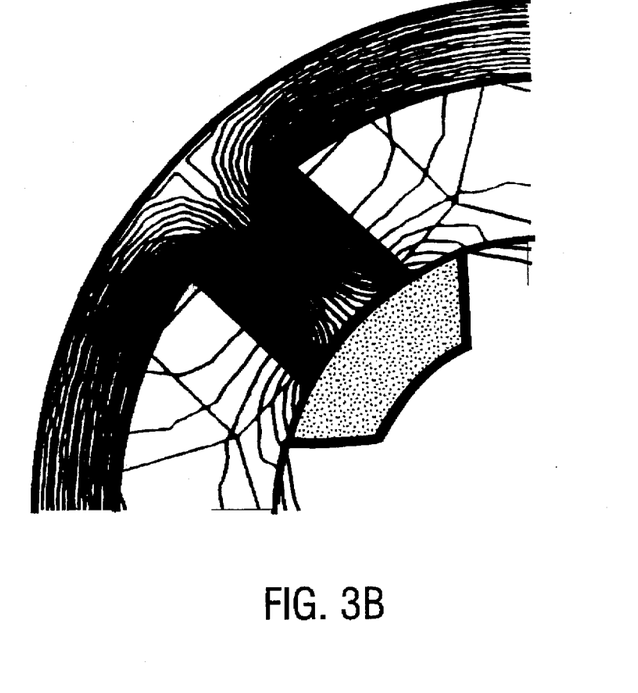

FIG. 3B illustrates a rotor assembly in accordance with the present invention as a rotor pole approaches a stator pole. In this embodiment, the support bar 21 is formed of a highly conductive material (or is coated with a highly conductive material) such that eddy currents are induced in the support bar 21 as the rotor rotates. These eddy currents turn the support bar 21 into a "flux blocker" that significantly reduces the amount of flux that can flow from the stator pole through the interpole region of the rotor. In general, the flux that would have otherwise passed through the interpole region of the rotor (decreasing motor efficiency) is blocked or diverted such that it flows thorough a rotor pole (contributing to torque production and increasing the motor efficiency.

It should be noted that FIGS. 3A and 3B illustrate in a general manner only the complex flux patterns of a switched reluctance motor. These Figures are provided for illustrative purposes and do not purport to reflect accurately the complex flux patterns that exist in a switched reluctance motor.

Figure 4:
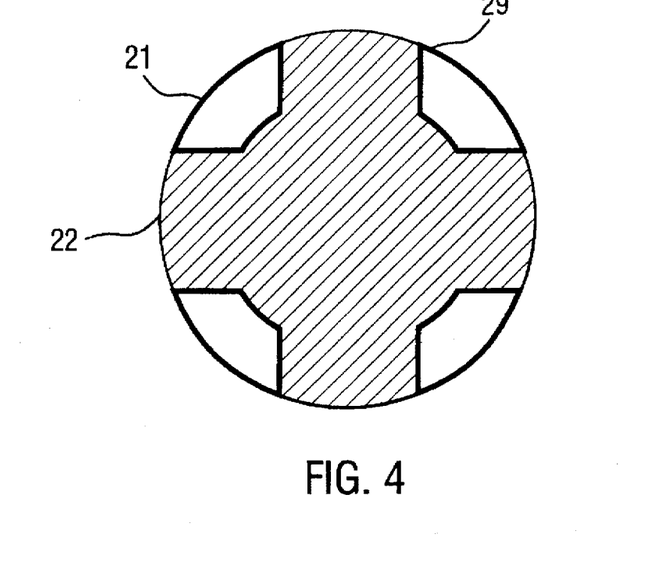
FIG. 4 is a cross-sectional view of a rotor assembly in accordance with the present invention including support bars coated with a highly conductive material.

Embodiments of the present invention in which the support bars 21 are electrically conductive are envisioned in which the support bars comprise support elements coated with a highly conductive material. Such an embodiment is illustrated in FIG. 4 which is a cross section of an assembled rotor assembly such as is illustrated in FIG. 2. In this embodiment, the stack of rotor laminations 22 is encased within a cage formed by support bars 21. In accordance with the present invention, a highly conductive material (e.g. silver) is used to coat the support bars 21 of cage 20 to form an external coating 29. This conductive coating 29 will have the effect of increasing the eddy current flow on the surface of the support bars 21 which will result in enhanced flux exclusion as the rotor rotates. In this embodiment, the support members can be made of a nonconductive insulating material such as plastic or ceramic. As discussed above, the overall cage structure must not result in an electrically conductive loop around the rotor poles. A further advantage of using the highly conductive coating is that the eddy currents flow essentially along a lossless path which reduces the amount of $I^2R$ losses and heat produced in the rotor.

In the embodiments of the present invention where the support bars 21 are highly conductive or where the support bars 21 are coated with a conductive coating, it is generally desirable to make the support bars 21 or the coating as electrically conductive as possible. This is because the increased conductivity both results in larger eddy currents and a greater capability of block flux. One may construct the support bars of a first material of high mechanical strength (e.g., titanium or ceramic) and then coat or plate the support bars with a highly conductive material such as silver. Further, in the embodiment of the present invention where the support bars are highly conductive, the support bars should be insulated from one another, at least at one end, to avoid the creation of an electrical short circuit around a rotor pole. Similarly, the support bars 21 may be insulated from the stack of rotor laminations 22. As discussed above, however, in the present invention it is not necessary to electrically insulate the support bars 21 from the rotor laminations 22.

In the present invention, the support bars are generally combined to form a cage in which the rotor laminations are placed. In general, many approaches to combining the support bars are envisioned, with the only restriction being that they should not be combined in an arrangement that forms any electrical circuit around all or any part of a rotor pole. Such an electrical short-circuit could inhibit flux variations in the rotor and inhibit rotor performance. One approach for combining the support bars (whether highly conductive or not) to form a cage 20 is illustrated in FIG. 2. Referring back to FIG. 2, the support bars 21 are connected to an endplate 24 to form a cage in which the rotor lamination stack 22 is placed.

Extending from cage 20 is a shaft element 28 that may be used to couple the rotor to the load so that useful work can be performed by the reluctance machine. A stub 27 extends from end plate 24 which may be received by the nondrive end bearing. In the embodiment illustrated in FIG. 2, the end plate 24 is made of a ceramic material and has external bores 25 placed to mate with corresponding bores 26 in cage 20 through which a screw or other coupling device may be used to affix end plate 24 to cage 20. In the embodiment of FIG. 2 the non-conductive ceramic endplate insulates the support bars 21 from one another. Alternate embodiments are envisioned in which the end plate comprises a conductive material. In those embodiments, some other means of insulating the support bars 21 from each other may be used (e.g., if the end plate 24 is made of metal, it must be insulated from the support bars 21 with, for instance, an insulating barrier disposed within or connected to the end plate). This is significant in that the overall cage structure must not result in an electrically conductive loop around the rotor poles as such a structure would tend to exclude flux from the rotor, degrading performance.

Figure 5:
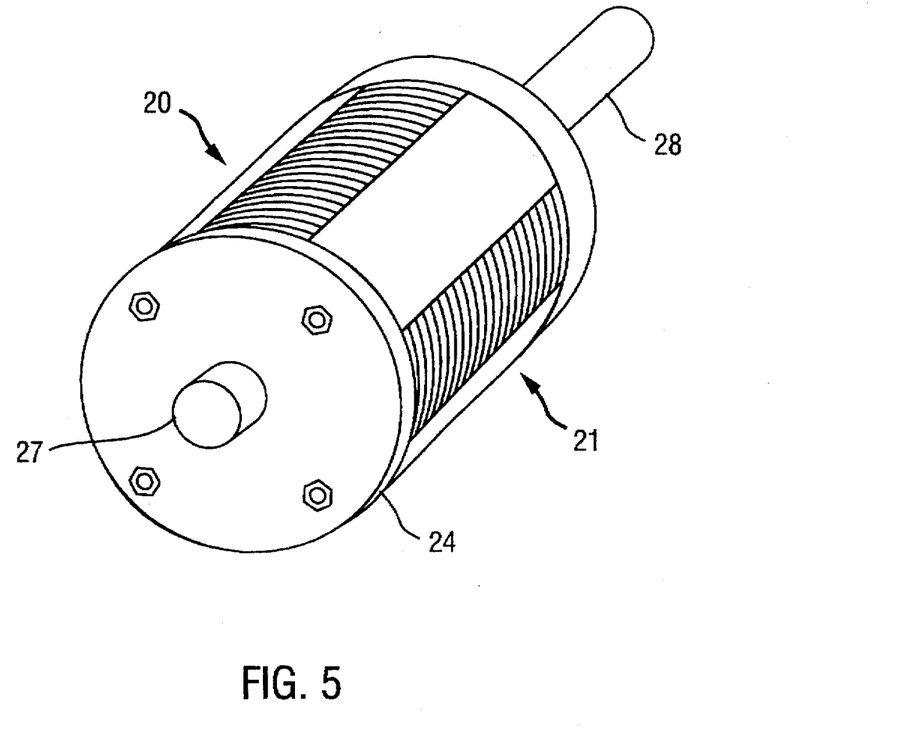
FIG. 5 is a perspective view of a rotor assembly in accordance with the present invention.

In the present invention, although the support bars 21 must be insulated from one another, at least at one end, the support bars need not be completely insulated from the laminations, but can be electrically coupled thereto. This is very different from the cages used in induction motors where it is highly desirable to provide electrically conductive loops within the cage. A completely assembled rotor using the embodiment of FIG. 3 is illustrated in FIG. 5.

There are several advantages to using the rotor assembly of the present invention. In particular, as the cage element 20 is of a larger diameter than the shaft 12 used in typical rotor assemblies, the stiffness of the rotor (and therefore the maximum safe speed) is greatly increased which may allow for extremely high speed rotor operations. Additionally, as there is no internal shaft for the rotor, the rotor back-iron thickness (i.e., the section illustrated as element 18 in FIG. 1A) may be increased without reducing the interpolar gaps and decreasing the performance of the motor. Accordingly, it is possible to provide an improved rotor assembly with decreased iron losses.

The mechanical strength of the individual rotor laminations in rotor assemblies of the present invention is far less significant than in earlier devices since most of the centrifugal stress is borne by the support bars 21 of the cage 20. Since the mechanical strength of the rotor laminations is not a paramount concern in rotor assemblies of the present invention, the rotor laminations made be annealed for best magnetic properties without compromising the strength of the rotor assembly. A further advantage is that the air-gap surface of the bars can be made smooth or round to produce a rotor assembly that has less drag and windage losses and which also produces less audible noise.

Figure 6:
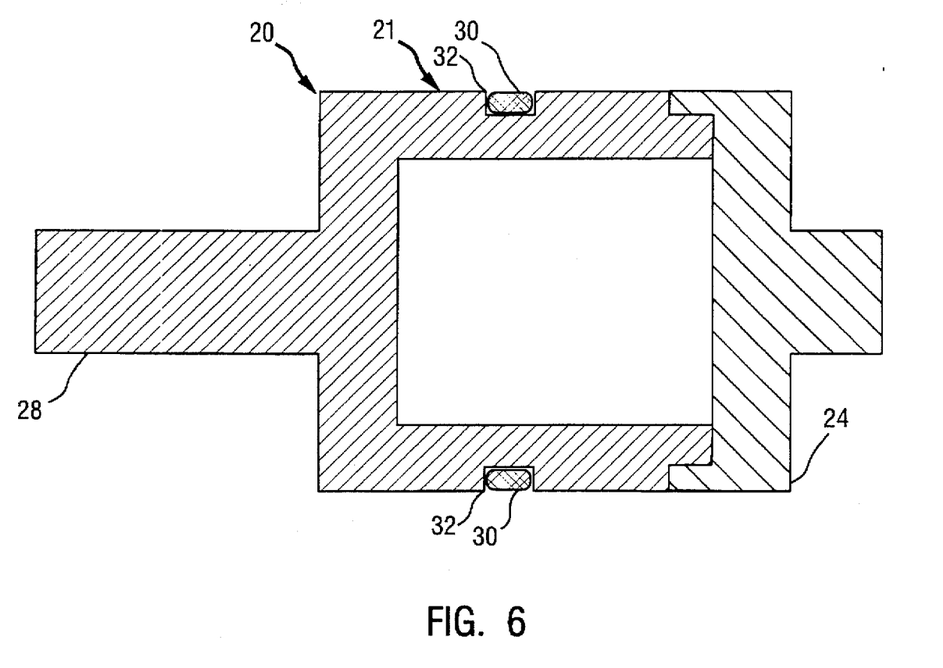
FIG. 6 is a sectional view of a rotor assembly with support bars braced with a fiber banding in accordance with the present invention.

At particularly high speeds it may be necessary to brace the support bars 21 against centrifugal forces resulting from high speed rotation. This could be done by applying bands of strong fibers (for example, Kevlar or insulated carbon fiber) circumferentially around the stack of rotor laminations and support bars 21. This embodiment is illustrated in FIG. 6 which shows a cage 20 coupled to end plate 24. The support bars 21 of cage 20 are provided with a notch or slot 30, of no particular shape, and a fiber banding 32 is placed within the notch for strength. This use of banding further increases the strength of the rotor allowing for even higher speed rotor operation.

An alternate approach to bracing the support bars 21 with fiber banding is to use strong non-ferromagnetic plates that are threaded onto the support bars at intervals along the rotor core. Such plates would have bores passing therethrough for receiving the support bars 21. One approach to implementing this alternative would be to break the support bars into several segments that are positioned between the support plates. This embodiment is illustrated in FIG. 7.

Figure 7:
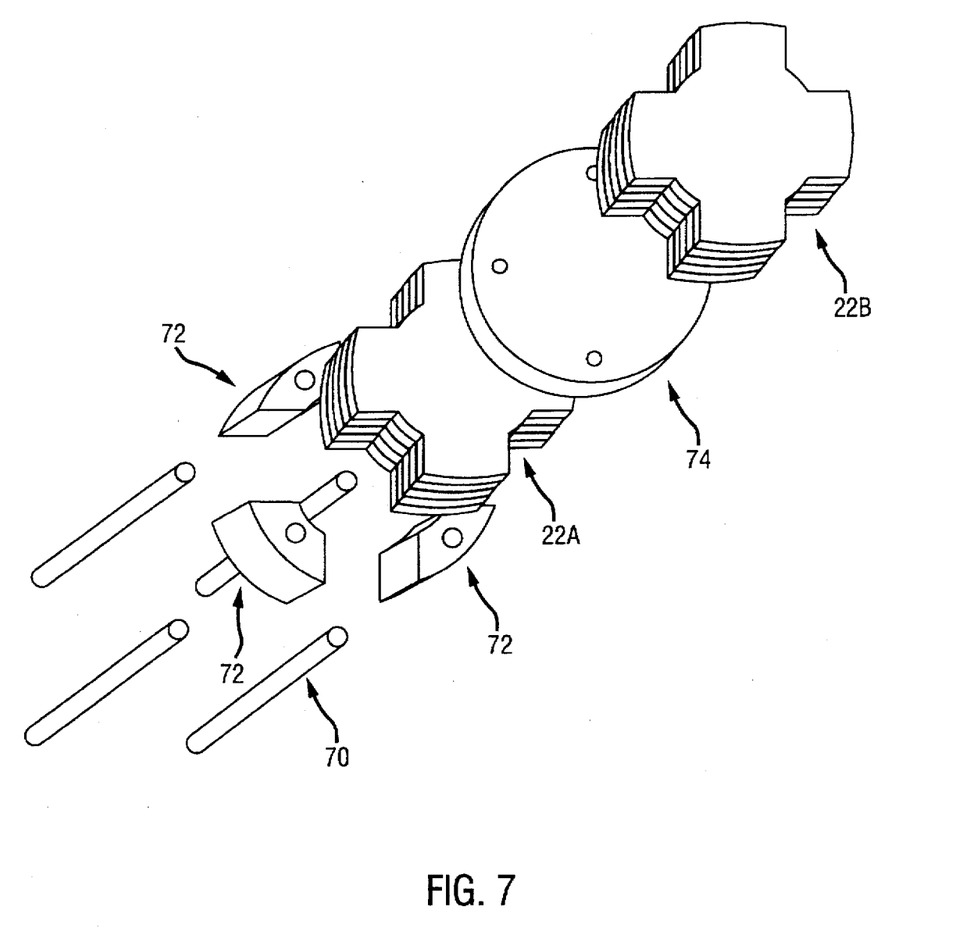
FIG. 7 is an exploded, perspective view of yet another embodiment of the rotor assembly of the present invention in which support discs are used to strengthen the rotor assembly.

In FIG. 7 the rotor assembly is formed from a stack of rotor laminations similar to those described above in connection with FIG. 2. In the embodiment of FIG. 7, however, the support bars are not solid members as in the embodiment of FIG. 2, but are instead comprised of pins 70 and support bar portions 72. As with the support bars of FIG. 2, the support bar portions 72 may be comprised of an electrically conductive material or a non-conductive material coated with a highly conductive material. Each support bar portion 72 includes a bore passing therethrough for reception of a pin 70.

In the embodiment of FIG. 7, the stack of rotor laminations is divided into one or more small stacks 22A and 22B, between which are sandwiched support plates 74. The support plates 74 may be round and should comprise a non-ferromagnetic material. Ceramic is one suitable material for the construction of support plates 74. Each support plate 74 includes a plurality of bores for receiving the pins 70. The support bar portions 72 are sized such that they substantially fill the interpole regions of the small rotor laminations stacks 22A and 22B. The pins are then threaded through the support bar portions 72 and the support plates 74 to form an integral rotor assembly. Appropriate end-plates may be coupled to the ends of the pins 70 to complete the rotor assembly.

It should be noted that, while the example of FIG. 7 illustrates a rotor assembly having two small rotor lamination stacks and a single support plate 74, other embodiments will have multiple small stacks of rotor laminations and multiple support plates.

Figure 8:
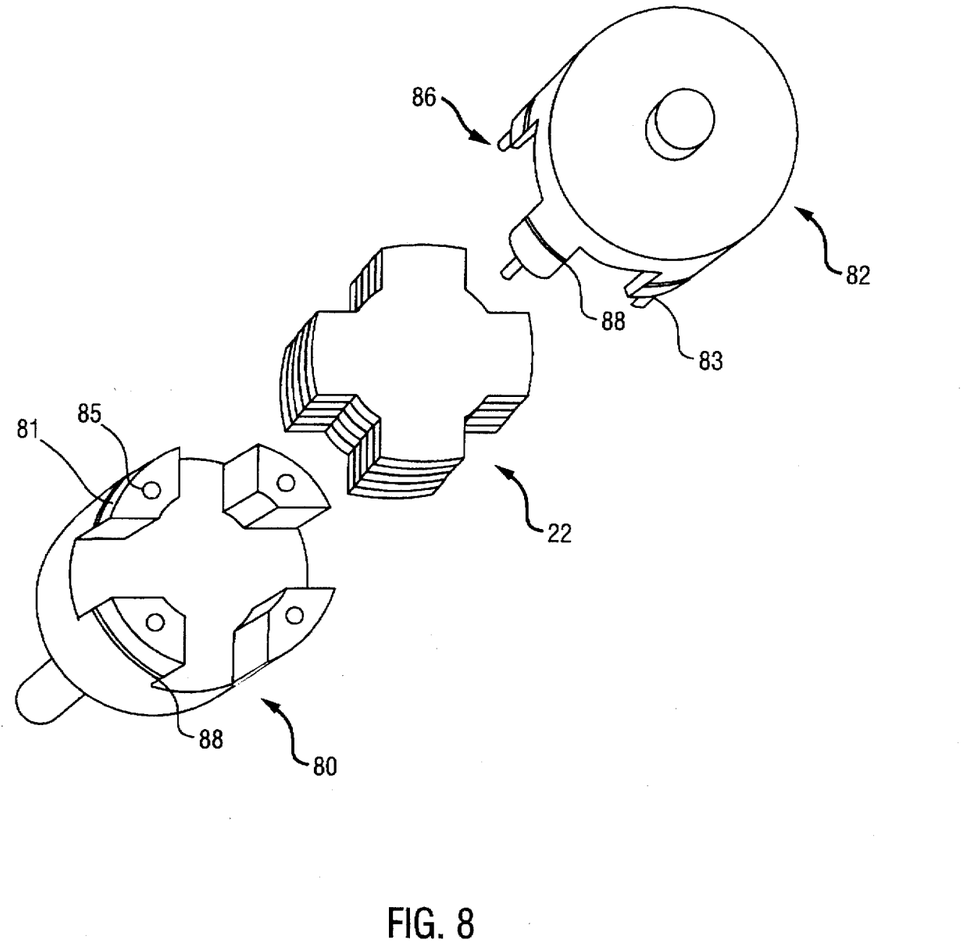
FIG. 8 is an exploded, perspective view of an alternative embodiment of the present invention in which two specially configured half-cage members are used to form a rotor assembly.

An alternative embodiment of the present invention is illustrated in FIG. 8. In this embodiment as opposed to using an end plate, two half-cage members 80 and 82, each having half support bars 81 and 83 extending therefrom. The half support bars may be electrically conductive or coated with an electrically conductive material to form transient "flux blockers" as described above. The half support bars 81 and 83 are arranged and sized to fit around a stack of rotor laminations 22. The stack of rotor laminations may be constructed in the same manner as described above with respect to FIG. 3.

Some method of connecting the half-cage elements must be provided. In the example illustrated in FIG. 8, holes 85 are provided in half-cage member 80 for receiving pins 86 extending from half-cage member 82. In the embodiment of FIG. 8, slots 88 are provided for receiving a fiber band (not illustrated) to brace the rotor assembly against centrifugal stresses in a manner similar to that described in connection with FIG. 6.

As discussed above, it is important that there not be any closed electrical loops formed by the rotor cage assembly. Accordingly, the materials that comprise half-cage member 80 and 82 should either be both nonelectrically conductive, one electrically conductive and one nonelectrically conductive, or both electrically conductive with an insulating member provided at the junction of the two half-cage portions such that a closed electrical loop is not formed. Moreover, in embodiments where electrically conductive coatings are used to enhance eddy current flow to enhance motor performance, the coating should be placed along the cage such that no closed electrical loops are formed.

Figure 9:
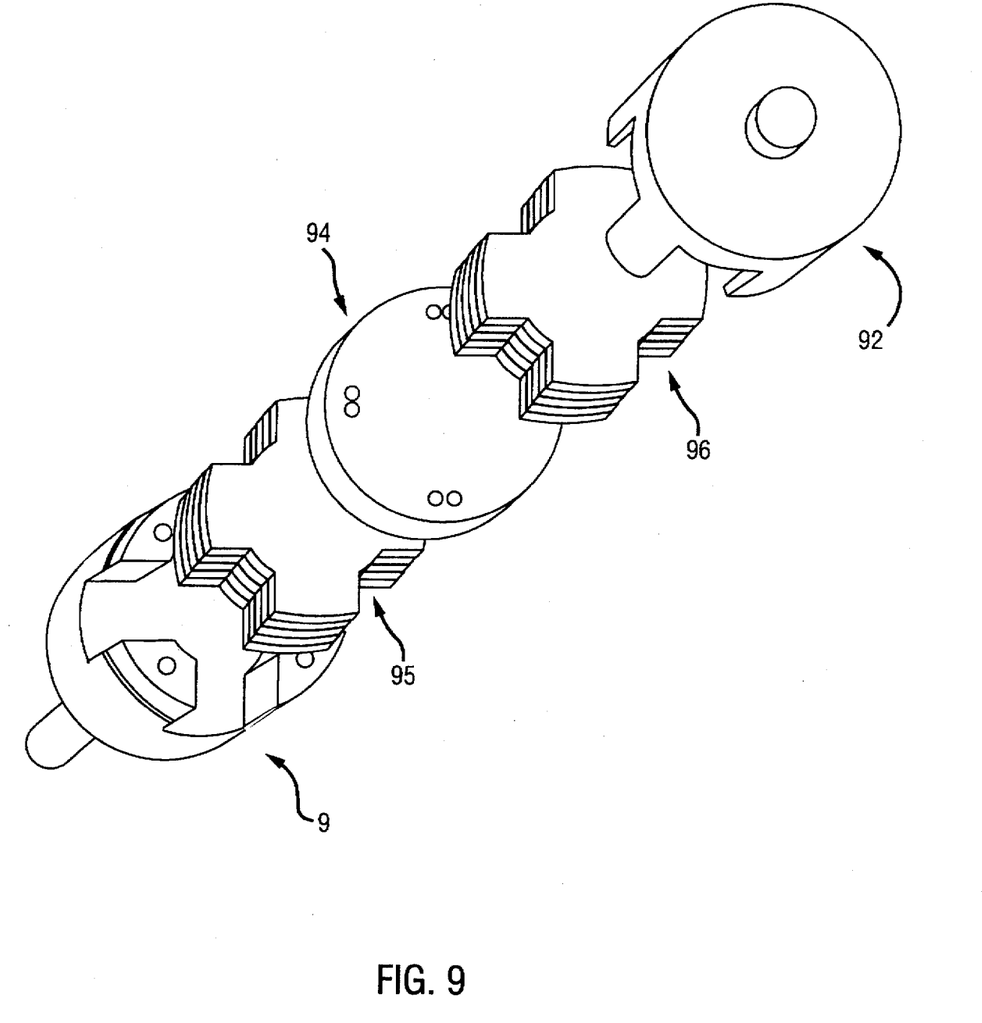
FIG. 9 is an exploded, perspective view of a rotor assembly with still another alternative embodiment of the present invention in which a combination of support discs and partial cage members are used to form a rotor assembly according to the present invention.

A still further embodiment of the present invention, particularly suited to applications where electrically conductive support bars are desirable, is illustrated in FIG. 9. In this embodiment two half-cage members 91 and 92, similar to those used in the embodiment of FIG. 8, are provided. A centralized support plate 94 having holes passing therethrough is placed between two rotor lamination stacks 95 and 96. The rotor lamination stacks may be formed in a manner similar to that described above in connection with FIG. 3. The half cage members 91 and 92 are coupled to the support plate 94 via pins, screws, rods or other like elements which pass through the bores in the half-cage members 91 and 92 and the support plate 94.

The embodiment illustrated in FIG. 9 is particularly suited to applications where electrically conductive support bars are desirable. In particular, if the half-cages 91 and 92 are made of electrically conductive material (or coated to be electrically conductive), if the support plate 94 is made of insulating material and if nonconductive elements are used to affix half-cage member 91 to half-cage member 92, there will be no closed electrical loop formed by the rotor cage. There will, however, be conductive support bar portions extending from both half-cage elements which can provide the eddy current flow needed to produce the "flux blockers" which results in increased motor performance. In this embodiment, highly conductive material can still be placed on the half-cage members but care should be taken such that no electrically conductive loops are formed.

In the foregoing specification, the invention has been described with reference to specific exemplary embodiments. It will, however, be evident that various modifications and changes may be made thereto without departing from the broader spirit and scope of the invention as set forth in the appended claims. For example, the present invention is applicable to reluctance machines having numbers of stator and rotor poles different from those illustrated above. Further, the present invention is applicable to reluctance machines having a different number of phases than those discussed above in connection with the above examples. Moreover, although the above examples illustrate machines where the rotor fits within a bore of the stator, the present invention is also applicable to "inverted machines" (i.e., machines where the rotor runs outside of the stator). The specification and drawings are, accordingly, to be regarded in an illustrative rather than a restrictive sense.

What is claimed is:

1. A rotor assembly for a reluctance machine comprising:
   a stack of rotor laminations having a plurality of rotor poles, defining interpole regions between adjacent rotor poles, each interpole region having an axial length;
   a plurality of support bars aligned between at least a plurality of said rotor poles extending along at least a portion of the axial length of a plurality of the interpole regions, each support bar including a notch defined in an outer surface of the support bar; and
   at least one band circumferentially applied around the stack of rotor laminations and the support bars to provide support thereto, the band being at least partially contained within the notches.

2. The rotor assembly of claim 1 wherein the support bars are electrically conductive.

3. A rotor assembly for a reluctance machine comprising:
   a stack of rotor laminations having a plurality of rotor poles defining interpole spaces between adjacent rotor poles, each interpole space having an axial length;
   a plurality of highly electrically conductive support members extending along at least a portion of the axial length of and filling a plurality of the interpole spaces, wherein a first end of each highly electrically conductive support member is coupled to a first end plate which is in proximity to an end of the rotor stack; and
   a stub shaft coupled to the first end plate, wherein the stub shaft does not extend through the rotor stack, and wherein the highly electrically conductive support members retain the stack of rotor laminations together; and wherein the highly electrically conductive support members are coupled such that no highly electrically conductive loop forms around the rotor poles.

4. The rotor assembly of claim 3 wherein the highly electrically conductive support members comprise a support member provided with a surface layer of highly electrically conductive material.

5. The rotor assembly of claim 4 wherein the highly electrically conductive material is silver.

6. The rotor assembly of claim 3 further comprising a band surrounding the highly electrically conductive support members and the stack of rotor laminations.

7. The rotor assembly of claim 3 wherein the highly electrically conductive support members comprise bars of highly electrically conductive material.

8. The rotor assembly of claim 3 wherein the highly electrically conductive support members comprise bars of insulating material coated with a highly electrically conductive material.

9. The rotor assembly of claim 8 wherein the insulating material is ceramic and the highly electrically conductive material is silver.

10. A rotor assembly in a reluctance machine comprising:
    a first stack of rotor laminations having a plurality of rotor poles defining a first group of interpole regions between adjacent rotor poles, each interpole region having an axial length and two ends;
    a second stack of rotor laminations having a plurality of rotor poles defining a second group of interpole regions between adjacent rotor poles, each interpole region having an axial length and two ends;
    a non-magnetic, non-conducting support plate disposed between an end of the first stack and an end of the second stack;
    a first plurality of electrically conductive support bar portions positioned within the interpole regions of the first stack and extending along a first portion of the axial length of a plurality of the interpole regions in the first group of interpole regions, the first plurality of electrically conductive support bar portions extending from a first end plate, the first end plate being in proximity to the end of the first stack which is not in proximity to the support plate, and a second plurality of electrically conductive support bar portions positioned within the interpole regions of the second stack and extending along a second portion of the axial length of a plurality of the interpole regions in the second group of interpole regions, the second plurality of electrically conductive support bar portions extending from a second end plate, the second end plate being in proximity to the end of the second stack which is not in proximity to the support plate; and
    means for coupling the first and second pluralities of electrically conductive support bar portions to the support plate.

11. The rotor assembly of claim 10 wherein the means for coupling comprise pins.

12. The rotor assembly of claim 10 wherein the support plate is formed from a ceramic material.

13. The rotor assembly of claim 10 wherein the support bar portions comprise a first material coated with a highly conductive material.

14. The rotor assembly of claim 13 wherein the highly conductive material is silver.

15. A rotor assembly for a reluctance machine comprising:
    a stack of rotor laminations having a plurality of rotor poles defining interpole regions between adjacent rotor poles, the interpole regions having an axial length;
    a first half-cage member having a first group of support bar portions extending from an end surface thereof, the first group of support bar portions positioned within the interpole regions of the stack of rotor laminations extending along a first portion of the axial length of the inter-pole regions;
    a first stub shaft extending from the first half-cage member in a direction opposite the first group of support bar portions;
    a second half-cage member having a second group of support bar portions extending from an end surface thereof, the second group of support bar portions positioned within the interpole regions of the stack of rotor laminations extending along a second portion of the axial length of the inter-pole regions and coupled to the first group of support bar portions; and
    a second stub shaft extending from the second half-cage member in a direction opposite the second group of support bar portions.

16. The rotor assembly of claim 15 further comprising at least one band applied around the first group of support bar portions to provide support thereto.

17. The rotor assembly of claim 15 wherein the support bar portions comprising the first group are electrically conductive.

18. The rotor assembly of claim 17 wherein the support bar portions comprising the first group are coated with a highly conductive material.

19. The rotor assembly of claim 18 wherein the highly conductive material is silver.

20. The rotor assembly of claim 15 wherein the first half-cage member comprises an electrically conductive material and the second half-cage member comprises an insulating material.

21. The rotor assembly of claim 15, wherein both the first and second half-cage members comprise an electrically conductive material, further comprising an insulating member disposed between the first and second support bar portions that comprise the first and second groups of support bar portions.

22. The rotor assembly of claim 15, wherein the stack of rotor laminations comprises a first stack and a second stack, and a support plate is disposed between the first and second stacks.

23. The rotor assembly of claim 22 wherein the second group of support bar portions is coupled to the first group of support bar portions at the support plate.

24. The rotor assembly of claim 22 wherein the first and second half-cage members comprise an electrically conductive material and wherein the support plate comprises an insulating material.

25. A rotor assembly for a reluctance machine comprising:

a stack of rotor laminations having a plurality of rotor poles defining interpole regions between adjacent rotor poles, the interpole regions having an axial length and a first and second end;

a first plurality of highly electrically conductive, non-magnetizable members arranged in the interpole regions extending along at least a portion of the axial length of the interpole regions, wherein the first plurality of highly electrically conductive, non-magnetizable members do not form highly electrically conductive loops about each rotor pole, and wherein each of the first plurality of highly electrically conductive, non-magnetizable members is coupled to a first end plate to form a first cage portion, and wherein the first end plate is in proximity to the first end of the rotor stack; and a first stub-shaft coupled to the first end plate and projecting from the first end plate in a direction opposite of the first plurality of highly electrically conductive, non-magnetizable members.

26. The rotor assembly of claim 25 further comprising a second end plate which is coupled to a second end of the rotor stack, wherein the second end plate is coupled to the first plurality of highly electrically conductive, non-magnetizable members.

27. The rotor assembly of claim 26, further comprising a second stub shaft coupled to the second end plate and projecting from the second end plate in a direction opposite of the second plurality of highly electrically conductive, non-magnetizable members.

28. The rotor assembly of claim 25, further comprising a second plurality of highly electrically conductive, non-magnetizable members arranged in the interpole regions extending along at least a portion of the axial length of the interpole regions, wherein the second plurality, of highly electrically conductive, non-magnetizable members do not form highly electrically conductive loops about each rotor pole, and wherein each of the second plurality of highly electrically conductive, non-magnetizable members is coupled to a second end plate to form a second cage portion, and wherein the second end plate is in proximity to the second end of the rotor stack.

29. The rotor assembly of claim 28 wherein the highly electrically conductive, non-magnetizable members comprising the first cage portion interconnect with the highly electrically conductive, non-magnetizable members comprising the second cage portion between the first and second end plates.

30. The rotor assembly of claim 25 wherein each highly electrically conductive, non-magnetizable member comprises a surface layer of highly electrically conductive material.

31. The rotor assembly of claim 30 wherein the highly electrically conductive material is silver.

32. The rotor assembly of claim 25 further comprising a band surrounding the highly electrically conductive, non-magnetic members and stack of rotor laminations.

33. The rotor assembly of claim 32 further comprising a circumferential channel formed in some of the rotor laminations and in the highly electrically conductive, non-magnetic members, wherein the band is received in the circumferential channel.

34. The rotor assembly of claim 28 wherein the first end plate comprises an electrically conductive material and the second end plate comprises an insulating material.

* * * * *